Figure 1:
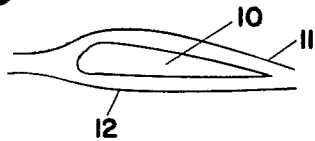

March 1, 1966  C. J. LITZ, JR  3,237,889
ANTI-STALL SYSTEM
Filed Sept. 21, 1964  2 Sheets-Sheet 1

INVENTOR.
CHARLES J. LITZ, JR.
BY:
ATTORNEYS.

March 1, 1966  C. J. LITZ, JR  3,237,889
ANTI-STALL SYSTEM
Filed Sept. 21, 1964  2 Sheets-Sheet 2
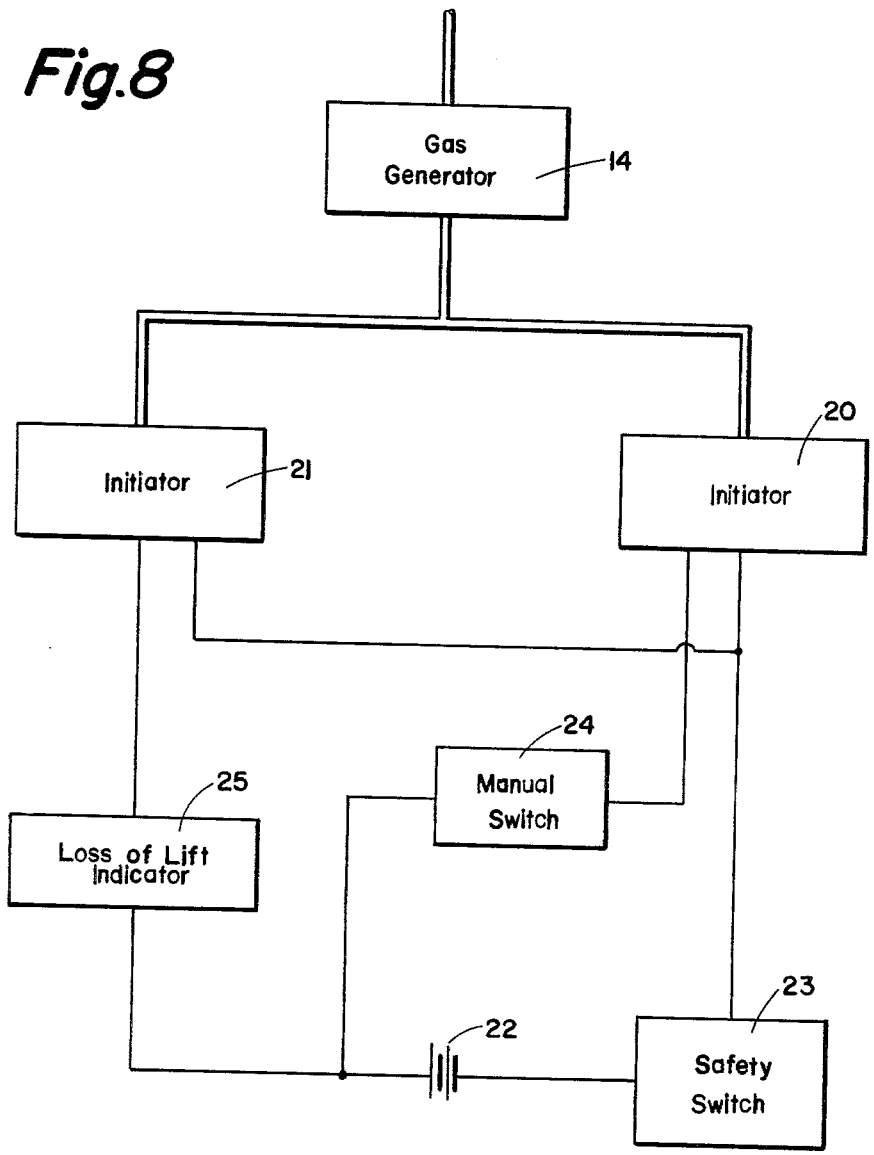
INVENTOR.
CHARLES J. LITZ, JR.

United States Patent Office 3,237,889
Patented Mar. 1, 1966

3,237,889
ANTI-STALL SYSTEM
Charles J. Litz, Jr., Philadelphia, Pa., assignor to the United States of America as represented by the Secretary of the Army
Filed Sept. 21, 1964, Ser. No. 398,134
4 Claims. (Cl. 244—42)
(Granted under Title 35, U.S. Code (1952), sec. 266)

The invention described herein may be manufactured and used by or for the Government for governmental purposes without the payment to me of any royalty thereon.

This invention relates to systems for improving the safe flight characteristics of aircraft at take-off, at landing and wherever incipient stalling is encountered, and is a continuation-in-part of my co-pending application, Ser. No. 265,319, filed Mar. 13, 1963, now Patent 3,149,804.

The lift of an aircraft wing or airfoil in the normal flight of an aircraft is dependent on the relative flow of air over its surface as the aircraft is propelled forward. When the velocity of the aircraft is decreased, however, the angle of attack of the airfoil must be increased in order to maintain the required amount of lift. If the velocity of the aircraft decreases to a point where an increase in the angle of attack no longer results in sufficient lift, stalling is encountered. At this angle of attack, the resulting turbulence has destroyed the circulation flow or laminar layer of air, resulting in the loss of lift.

Heretofore various types of aerodynamic or pumping devices have been proposed or utilized to maintain a turbulence-free smooth flow of air when the angle of attack is at a maximum as at take-off and landing. Some of these aerodynamic devices have involved the use of fixed or movable nose slots. Others have utilized an aileron slot or near trailing edge portion slot. All of these devices whether automatic, aerodynamic or mechanical have been less than completely satisfactory for the reason that their operation involves mechanical adjustments, which require time and are not always effective in sufficiently short time to prevent stall when finally completed. This is so for the reason that loss of lift occurs in a period of the order of 0.2 second.

The present invention provides a system which functions instantaneously or within a period of 0.1 second to maintain a turbulence-free smooth flow of air when the angle of attack is at a maximum and stall is imminent or actual. In the operation of this system, a fluid preferably in the form of propellant gas is instantly *blown out* at the appropriately demonstrated aerodynamic locations through slots or perforations distributed about the upper surface of the airfoil or wing of the aircraft adjacent the leading and/or trailing edge of the airfoil. This action causes the circulation flow or laminar layer to be re-attached and to adhere to the upper surface of the airfoil. As a result, stalling is corrected and the forward speed of an airborne aircraft can be reduced safely during take-off and landing without the present hazards of loss of adequate sustaining lift.

As will appear, an outstanding feature of the present invention is the provision of means for blowing a high energy gas out of the aerodynamically located apertures near leading and trailing edges of the airfoil. This gas may be supplied from a propellant or cartridge actuated generator which supplies high energy gas for operating other devices aboard military aircraft or may preferably be supplied from a separate cartridge actuated gas generator situated in the wing itself. In either case, the kinetic energy of the gas delivered from the cartridge actuated gas generator functions to blow high pressure gas through slots at nose or tail portions of the airfoil surface to re-establish normal circulation or laminar flow.

The invention will be better understood from the following description when considered in connection with the accompanying drawings and its scope is indicated by the appended claims.

Figure 2:
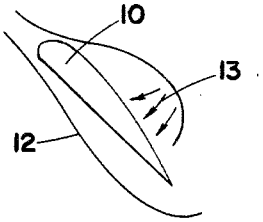
Figure 3:
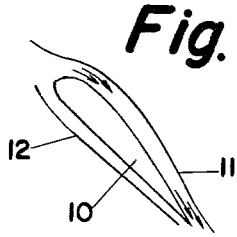
Figure 4:
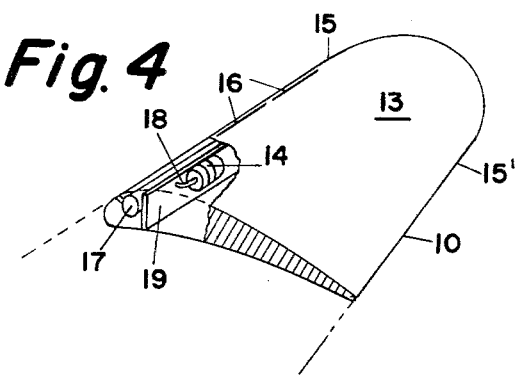
Figure 6:
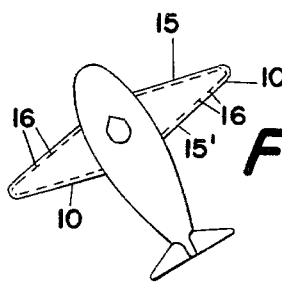
Figure 7:
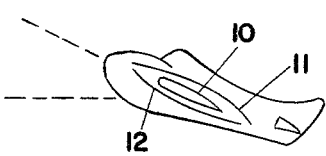
Figure 5:
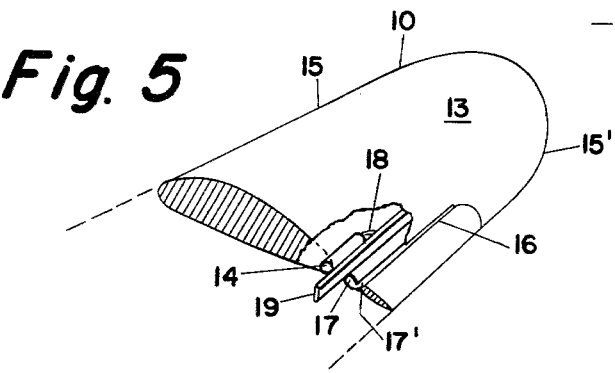

Referring to the drawings:

FIG. 1 indicates the air flow about an airfoil during normal flight,

FIG. 2 indicates the air flow about an airfoil at a maximum angle of attack where the resulting turbulence has destroyed the laminar layer or circulation flow of air resulting in loss of lift, FIG. 3 illustrates how the turbulence exhibited by FIG. 2 is counteracted by discharging fluid from the airfoil through the perforations in its upper surface to induce proper circulation flow, FIG. 4 is a perspective view partially broken away in section illustrating an arrangement embodying the principles of the invention, FIG. 5 is a view similar to FIG. 4 illustrating an alternative arrangement which may be incorporated with the structure of FIG. 4, FIGS. 6 and 7 are top and side views of an aircraft equipped with this anti-stall blowing system, and FIG. 8 illustrates various details of a preferred propellant gas generator control system which may be incorporated in the anti-stall arrangement.

FIG. 1 shows an airfoil 10 as it is positioned in normal flight. In this position, there is a circulation of air flow 11 above the airfoil and an air flow 12 below it according to Dr. Prandtl and the resulting lift maintains the aircraft on course so long as it is propelled forward with sufficient force. When the velocity of the aircraft decreases, however, the angle of attack of the airfoil must be increased in order to maintain the required amount of lift. If the velocity of the aircraft decreases to a point where an increase in the angle of attack no longer produces sufficient lift, or the angular attitude of the aircraft exceeds that of maximum lift coefficient the airfoil is said to be in a "stalled" position. At this angle of attack, the resulting turbulence 13 (FIG. 2) has destroyed the circulation or laminar layer of air flow, resulting in the loss of lift.

The present system obviates this difficulty by blowing high pressure gas through appropriately and aerodynamically placed apertures near nose and/or trailing edges of the airfoil. This action causes the circulation or laminar flow of air to reattach and adhere to the surface of the airfoil, thereby eliminating the turbulence of discontinuous flow and resulting in smooth reattached flow lines as indicated in FIG. 3 and FIG. 7.

The stabilizing flow of air is effected by blowing pressurized fluid out appropriately located apertures 16 in the airfoil upper surface 13 adjacent the leading edge 15 thereof as illustrated in FIG. 4 or adjacent the trailing edge 15' (FIG. 5 or adjacent both edges 15 and 15'. A plenum chamber 17 which is connected to a source of high energy gas such as the propellant gas generator 14 via suitable manifold means 18 extending through mounting plate 19 for the plenum chamber and generator, is provided with appropriate passages 17' that communicatively connect with the respective ports 16. As viewed in FIG. 6 both the leading and trailing edges 15, 15' preferably are provided with apertures 16 for blowing fluid therethrough in a simultaneous or controlled manner. Separate gas generators 14 may be employed for the respective leading or trailing anti-stall units or a common gas generator properly connected to the exhausting units may be relied upon, if desired.

The propellant gas generator or each generator 14 includes a plurality of charges. One of these representative propellant charges is fired by an initiator 21 (FIG. 8) which is energized by a voltage applied by a battery 22 through an automatic loss of lift indicator 25 and the safety switch 23 to the initiator 21, the safety switch 23 being normally closed by a pilot during take-off, landing or at other desired portons of the flight profile. Other charges of the propellant gas generator 14 are fired by an initiator 20 that is energized by a voltage applied by the battery 22 through a manually operated switch 24 and the safety switch 23 after it has been closed by the pilot. The relation between these various parts of the control system is indicated by FIG. 8 wherein the gas conductors are represented by double lines and the electrical conductors are indicated by single lines.

In the operation of the system, a high velocity jet of gas is delivered from the generator 14 through its respective manifold arrangement 18 and openings 16. Sufficiently high velocity of the exhausting gas is obtained by virtue of the nozzle-like arrangement of manifold passages 17' to assure attaining sufficiently high velocity and correspondingly low pressure over the airfoil for attaining the desired lift at the crucial stall threatening moment. A clear understanding of this concept of how the instant airfoil construction functions to prevent stalling can be seen upon a consideration of Bernoulli's theorem. This theorem states that the energy in any system remains constant. Thus the air flowing past the airfoil 10 forms a circulation system to which the theorem is applicable. The energy in a given air mass is the product of its pressure and velocity. If the energy is to remain constant, it follows that an increase in velocity will produce a decrease in pressure. Thus the air that passes over the airfoil must travel a greater distance than the air flowing under it. Since the two parts of the air stream reach the airfoil's trailing edge at the same time, the air that flows over the airfoil must move faster than the air that flows under it. In accordance with Bernoulli's theorem, and Dr. Prandtl's circulation flow this results in a lower pressure on the top than on the bottom of the airfoil. This pressure differential tends to force the airfoil upward giving it a lift which counteracts stalling. This invention conceives a unique automatic instantaneous means of application of propellant energy, within the airfoil, to exaggerate or augment, through combination of energy added to normal aerodynamic phenomena, to instantly control and continue the circulation flow and thus prevent stall.

As can be readily understood by those skilled in the ballistic and aerodynamic arts, the use of a cartridge actuated gas generator, responsive to a loss of lift or stall indicator that functions upon break in circulation flow, to produce this blowing pressure fluid, has the important advantage that a cartridge operated gas generator is a device already available for other functions as part of the normal equipment of military aircraft, always ready to function upon demand. Such cartridge actuated gas generators when located within the wings contiguous to the external aerodynamic slots afford the most direct, fail-safe energy source, automatically and aerodynamically released. It has been established that loss of lift involves a time of about 0.2 second and that the present invention restores lift in approximately 0.1 second. Such instant response is highly desirable and uniquely applicable in the split second catastrophic situation encountered in a stall emergency and has not been realized in the operation of the aerodynamic and mechanical anti-stall systems heretofore available.

A fail-safe, ultra reliable means for the instantaneous recovery of lift has long been sought. For this purpose, fixed and movable nose slots, and trailing edge portion slots and flaps have been utilized previously with something less than completely satisfactory results. The utilization of an automatic combination of ballistic, mechanical and aerodynamic phenomena to counteract stalling of an aircraft is a concept not heretofore realized by those skilled in the art. It has the important advantage that (1) the anti-stall power is not drawn from the main power source at a time when it is subjected to an excessively large demand, and (2) this anti-stall power may be applied automatically and repeatedly by the successive firing of a plurality of cartridges.

Various modifications, changes or alternations may be resorted to without departing from the scope of the invention as defined by the appended claims.

I claim:

1. An aircraft anti-stall system comprising
an airfoil having leading and trailing edges,
port means in the upper side of said airfoil adjacent at least one of said edges,
means for indicating a loss of lift to an aircraft in which said system is used, and
cartridge actuated gas generating means responsive to said indicating means and connected to said port means for delivering a sudden burst of high pressure fluid outwardly through said port means,
so constructed and arranged that external travel of said fluid rearwardly from said port means will provide a stalling aircraft with a capacity to have a laminar layer of air reattached or re-adhered to the upper surface of said airfoil.

2. An aircraft anti-stall system comrpising
an airfoil having leading and trailing edges,
port means extending longitudinally across the upper side of said airfoil adjacent at least one of said edges,
means for indicating a loss of lift to an aircraft in which said system is used, and
cartridge actuated gas generating means within said airfoil responsive to said indicating means and connected to said port means for blownig a sudden burst of high pressure fluid outwardly through said port means,
so constructed and arranged that external travel of said fluid rearwardly from said port means will provide a stalling aircraft with a capacity to have a laminar layer of air reattached or re-adhered to the upper surface of said airfoil.

3. An aircraft anti-stall system comprising
an airfoil having leading and trailing edges and having a laminar layer of rearward air flow therepast during normal flight conditions,
port means in the upper side of said airfoil adjacent said edges,
means for indicating a stall tendency condition in an aircraft with which said system is used, and
cartridge actuated gas generating means responsive to said indicating means and connected to said port means for delivering a sudden burst of high pressure fluid outwardly through said port means,
so constructed and arranged that external travel of said fluid rearwardly from said port means will provide a stalling aircraft with a capacity to have the laminar layer of air reattached and re-adhered to the upper surface of said airfoil.

4. An aircraft anti-stall system comprising
an airfoil having leading and trailing edges and having a rearward circulation of air flow therepast during normal flight conditions,
port means extending longitudinally across the upper side of said airfoil adjacent said edges,
means for indicating a stall tendency condition in an aircraft with which said system is used, and
cartridge actuated gas generating means within said airfoil, responsive to said indicating means and connected to said port means for blowing a sudden burst of high pressure fluid outwardly through said port means,
so constructed and arranged that external travel of said fluid rearwardly from said port means will provide a stalling aircraft with a capacity to have the laminar layer reattached or re-adhered to the upper surface of said airfoil.

References Cited by the Examiner
UNITED STATES PATENTS

| | | | |
|---|---|---|---|
| 2,701,886 | 2/1955 | Ivie | 9—318 |
| 2,919,833 | 1/1960 | Wolshire | 9—318 |
| 2,969,206 | 1/1961 | Jensen | 244—42 |
| 3,058,695 | 10/1962 | Simonis | 244—42 |
| 3,085,740 | 4/1963 | Wagner | 244—42 |
| 3,142,457 | 7/1964 | Quenzler | 244—42 |

MILTON BUCHLER, *Primray Examiner.*
B. BELKIN, *Assistant Examiner.*